United States Patent [19]
Tanaka et al.

[11] Patent Number: 5,142,446
[45] Date of Patent: Aug. 25, 1992

[54] APPARATUS FOR SECURELY ATTACHING AND DETACHING PORTABLE COMPUTER TERMINALS TO PORTABLE OPTIONAL DEVICES

[75] Inventors: Masakazu Tanaka, Nara; Takashi Tatsumi, Osaka, both of Japan

[73] Assignee: Sharp Kabushiki Kaisha, Osaka, Japan

[21] Appl. No.: 633,331

[22] Filed: Dec. 27, 1990

[30] Foreign Application Priority Data

Jan. 9, 1990 [JP] Japan .................................. 2-3249
Jan. 9, 1990 [JP] Japan .................................. 2-3250

[51] Int. Cl.⁵ ........................... H05K 7/10; G06F 1/00
[52] U.S. Cl. .................................... 361/393; 361/380
[58] Field of Search ...... 364/708; 200/50 R, 61.58 R; 361/380, 390, 391, 392, 393, 394, 395, 399

[56] References Cited

U.S. PATENT DOCUMENTS

| | | | |
|---|---|---|---|
| 4,018,148 | 4/1977 | Wolbrink | 200/61.62 |
| 4,792,650 | 12/1988 | Iwai | 200/50 R X |
| 4,798,923 | 1/1989 | Barwick et al. | 200/50 R |
| 4,893,263 | 1/1990 | Myers | 364/708 |
| 4,926,365 | 5/1990 | Hsieh | 364/708 |
| 4,941,841 | 9/1990 | Darden et al. | 364/708 X |

FOREIGN PATENT DOCUMENTS 254456 1/1988 European Pat. Off.
2202381 9/1988 United Kingdom.

Primary Examiner—Leo P. Picard
Assistant Examiner—Michael W. Phillips
Attorney, Agent, or Firm—Nixon & Vanderhye

[57] ABSTRACT

A portable terminal computer is adapted for connection to an optional unit and a host computer. The optional unit (6) includes a connector (15) for electrical connection to the main body (1) of the portable computer, guides (8), a lock pawl (9) for coupling the optional unit (6) to the main body (1), and a lock release (17). The main body (1) includes guide inserting slots (10) in which guides (8) are inserted, a pawl inserting slot (11) in which the lock pawl (9) is inserted, and an engagement member (30) for engaging the lock pawl (9). The above-described structure allows smooth attachment and detachment of the main body (1) to and from the optional unit (6), thereby preventing malfunction.

9 Claims, 6 Drawing Sheets

APPARATUS FOR SECURELY ATTACHING AND DETACHING PORTABLE COMPUTER TERMINALS TO PORTABLE OPTIONAL DEVICES

BACKGROUND OF THE INVENTION

The present invention relates generally to a portable terminal computer having an operation portion and an input/output portion, a main body connectable to a host computer for communication, and an optional unit connectable to the main body, and more particularly, the invention relates to a technique of safely and securely attaching and detaching the main body to and from the optional unit.

For example, a modem communication device which receives and transmits data between a portable terminal computer and a host computer through a telephone line is conventionally used as an optional unit for connection to a main body of the portable terminal computer. The modem communication device is connected to the portable terminal computer by a flat cable having male connectors at the opposite ends thereof and if necessary, it is mounted on the portable terminal computer at a protruding bracket by screws.

When carrying the modem communication device together with the main body of the portable terminal computer to a customer, for example, the modem communication device must be fixed to the bracket of the main body by screws, which makes the attachment and the detachment using a screw driver time consuming and troublesome. Furthermore, the flat cable with the male connectors and the bracket protruding from the main body hinder transport of the device and detracts from a uniform appearance. In addition, when carrying the modem communication device detached from the main body, the connectors and the flat cable are damaged causing imperfect contact of the connectors, resulting in malfunction of the main body or the modem communication device.

The conventional portable terminal computer also allows attachment and detachment of the modem communication device at any time while the main body is activated. Unless the main body is deactivated prior to the attachment and detachment of the modem communication device, the bus of the connector cannot be protected which might result in damage to the portable terminal computer. The operation of the modem communication device is therefore complicated. The attachment of the device requires three operations: power off, mounting, and power on; and the detachment thereof requires at least three operations: power off, dismounting, and power on. Careless modem attachment and detachment without turning off the power supply causes portable terminal computer malfunction or damage.

SUMMARY OF THE INVENTION

An object of the present invention is to provide a portable terminal (or portable terminal computer) having a main body which can be directly attached and detached with ease to and from an optional unit using connectors of the main body of the terminal and the optional unit and which has flexible connection to the optional unit to make the terminal easy to carry and neat in appearance when the optional unit is securely attached.

Another object of the present invention is to provide a portable terminal computer directed to preventing difficulties in attaching and detaching an optional unit to and from a main body of the computer by detecting operations of connectors of the main body of the portable terminal computer and the optional unit.

The portable terminal computer according to the present invention which achieves the above-described objects includes a main body having operation and input/output portions separately transportable and connected to a host computer through communication means, and an optional unit to be connected to the main body. The optional unit is provided with a connector for a wiring connection to the main body, a guide for guiding the connection to the main body, and a lock pawl provided for a coupling to the main body and having lock releasing means. The main body includes a guide inserting slot in which the guide is inserted, a pawl inserting slot in which the lock pawl is inserted and engaging means for engaging the lock pawl inserted in the pawl inserting slot.

The portable terminal computer according to the present invention having the above-described structure operates as follows. First, in attaching the optional unit to the main body of the portable terminal computer, when the guide provided protruding from the optional unit is inserted in the guide inserting slot of the main body to bring the optional unit near the main body, both connectors of the main body are positioned to be easily mated, so that the lock pawl of the optional unit fits in the pawl inserting slot through the pawl inserting hole. Then, the lock pawl is engaged with the engaging portion of the main body to prevent the detachment of the optional unit from the main body. In detaching the optional unit from the main body, the operation of the lock releasing means causes the lock pawl to disengage from the engaging means. Subsequently, when the optional unit is pulled, the guide pulled out from the guide inserting slot guides the connectors and the lock pawl of the optional unit to smoothly detach from the main body, whereby the optional unit is dismounted.

According to another aspect of the present invention, in the portable terminal computer according to the present invention, the connector of the main body has its opening covered with a connector cover, and the optional unit is provided with locking means for coupling the unit to the main body. The optional unit is further provided with lock detecting means for detecting the operation of the locking means to determine whether the coupling to the main body is completed and outputting a signal to the main body. The main body is provided with a connector cover detecting means for determining whether the connector cover covers the opening of the connector or not to output the determination to the main body and power supply controlling means for controlling a power supply to the main body in response to the output signal to the main body.

The portable terminal computer having the above-described structure operates as follows. In attaching the optional unit to the main body of the portable terminal computer, first an operator opens the connector cover of the main body, which is detected by the connector cover detecting means provided at the main body to output an output signal to the main body, whereby the power supply controlling means inhibits power supply to the main body. Then, the operator completely mates and couples the optional unit to the main body, whereby the locking means of the optional unit completes the coupling operation to the main body. The lock detecting means provided at the optional unit detects coupling completion and outputs an output signal to the main body, whereby the power supply controlling means couples the power supply to the main body. Conversely, in detaching the optional unit from the main body, the operator pulls out the optional unit from the main body while releasing the locking means. As a result, the locking means coupling to the main body is removed, which is detected by the lock detecting means to output an output signal to the main body through the connector. In response thereto, the power supply controlling means inhibits power supply to the main body. The connector cover detecting means detects the optional unit being completely dismounted and the connector cover of the main body being closed to output an output signal. In response thereto, the power supply control means couples the power supply to the main body.

The above-described portable terminal computer according to the present invention allows attachment and detachment of the optional unit to the main body to be easily and quickly performed without using a screwdriver or the like. Flat cable and bracketed connections are eliminated. The computer is easy to carry and presents a uniform appearance. The portable terminal computer with the operational unit attached thereto can be therefore carried keeping the attachment firmly in place without causing malfunction due to damage or imperfect contact of the connector.

The power supply controlling means automatically controls a power supply to the main body in response to the output signals from the connector cover detecting means and the lock detecting means, which eliminates an anxiety of the operator about malfunction and damage to or restarting of power supply of the portable terminal computer. Easy attachment and detachment of the optional unit are achieved to and from the main body.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described with reference to the drawings in the following.

Figure 1:
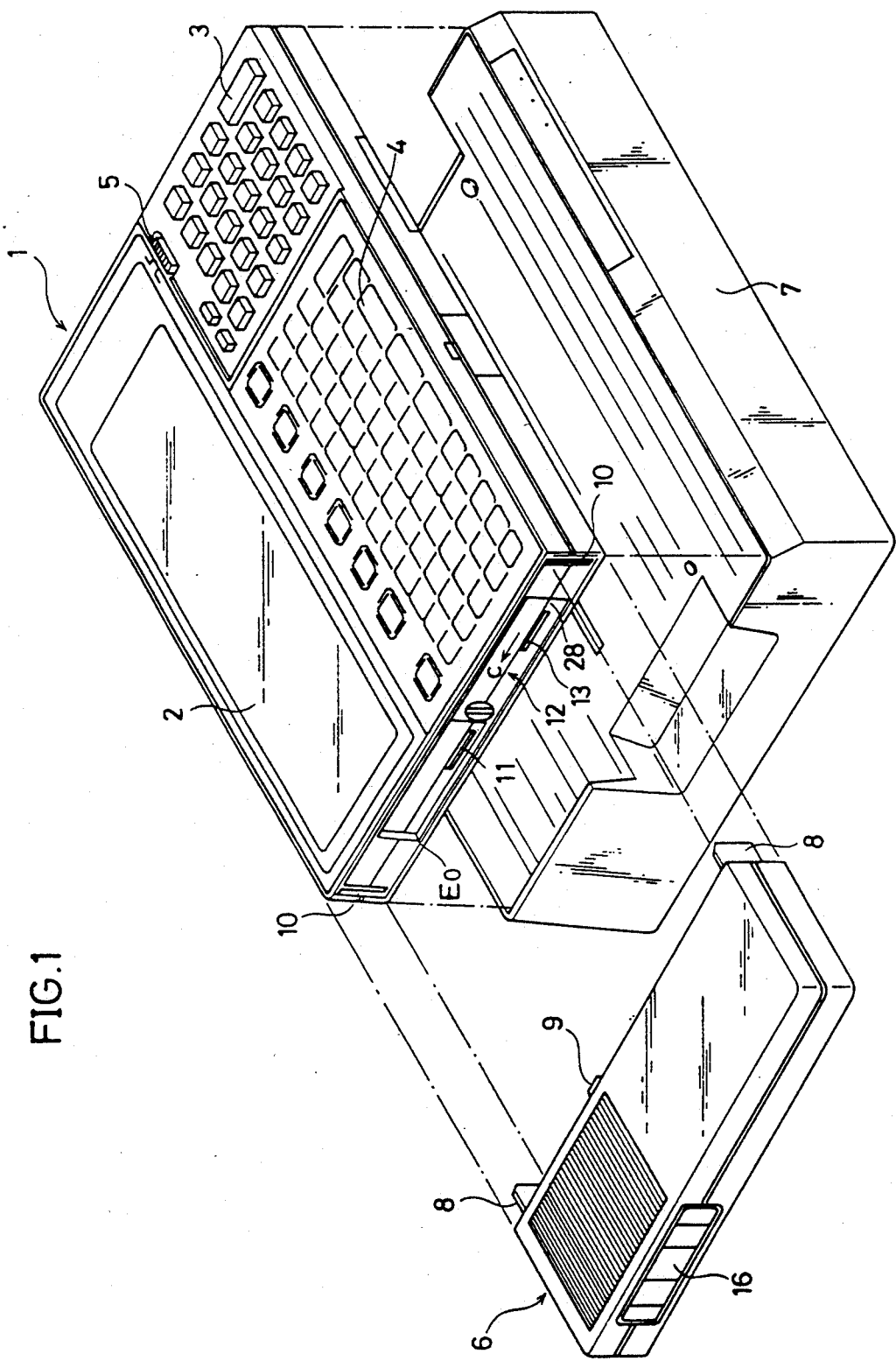
FIG. 1 is an exploded perspective view showing a portable terminal computer according to one embodiment of the present invention.

FIG. 1 shows the main body of the portable terminal computer and the optional unit according to the present invention connected to each other. With reference to FIG. 1, a main body 1 of the portable terminal computer comprises a liquid crystal display 2, a ten key keypad 3 as an input, a flat keyboard 4 including alphabet, Japanese character, and function keys arranged thereon, a power supply switch 5 and a built-in CPU 31 (see FIG. 5). A modem communication device 6 as an optional unit is connected to transmit and receive data signals between main body 1 and a telephone line (not shown) as required. An optical communication device 7 for transmitting and receiving optical signals to and from main body 1 is disposed between main body 1 and a host computer (not shown). Optical communication device 7 and the host computer are connected by means of a cable.

Guides 8 for guiding the portable terminal computer to connect with main body 1 by means of connectors are disposed at the opposite ends of modem communication device 6 to protrude from the side surface thereof. A lock pawl 9 for coupling to main body 1 is disposed at the center of the side surface to protrude therefrom. The side surface of the main body is provided with guide inserting slots 10 in which guides 8 are inserted, a pawl inserting slot 11 in which lock pawl 9 is inserted and a connector cover 12 sliding to open and close a connector opening 28 (see FIG. 4). Provided at connector cover 12 is a through hole 13 in which the pawl is inserted through connector cover 12 such that the hole 13 agrees with the position of pawl inserting slot 11 at the position where connector cover 12 fully opens connector opening portion 28, that is, when the end portion of connector cover 12 is positioned at one end ($E_0$ shown in FIG. 1).

Figure 2:
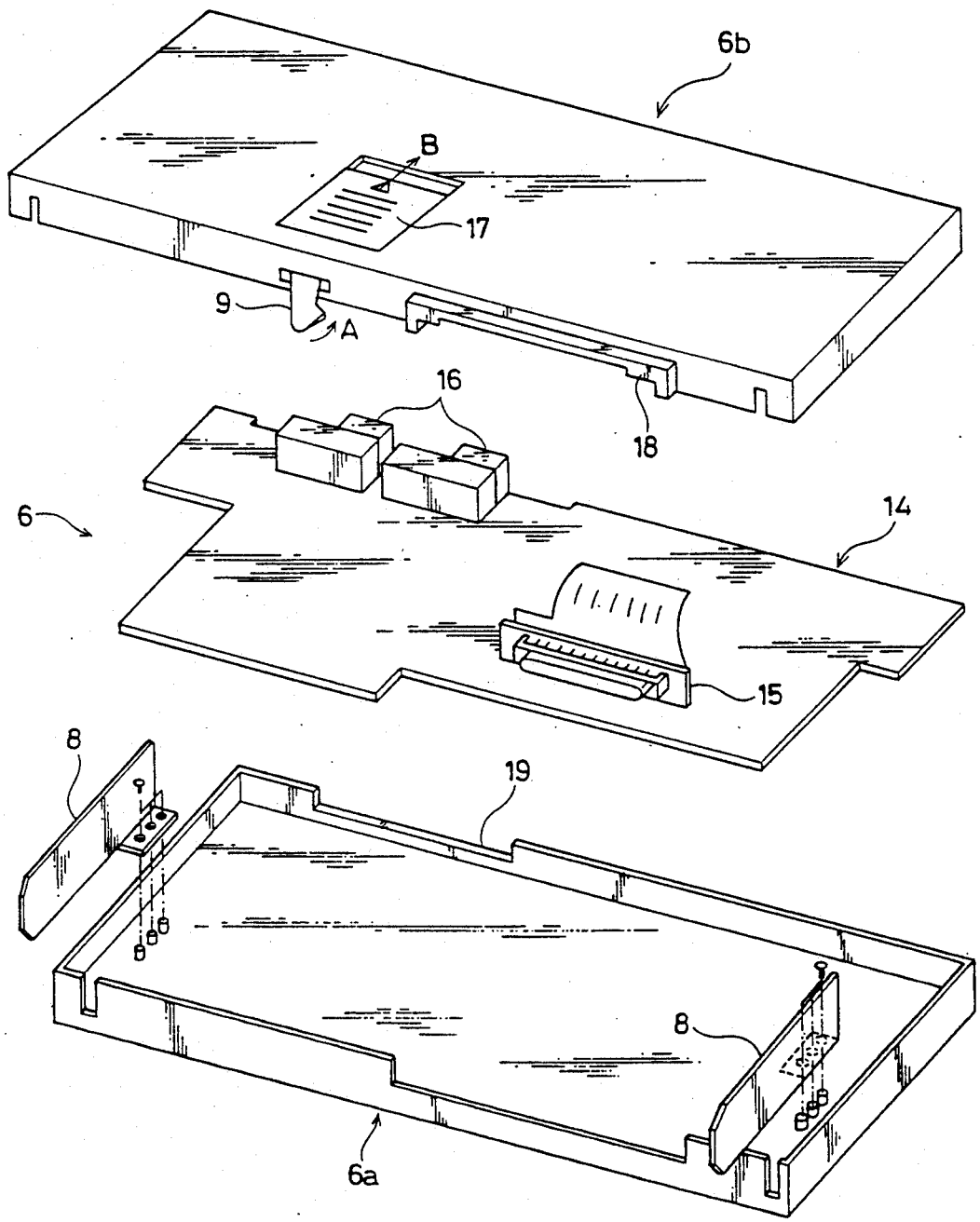
FIG. 2 is an exploded perspective view showing modem communication device 6 of FIG. 1 seen from its back.

Modem communication device 6 contains a circuit board 14 having a connector 15 and an interface connector 16 for connecting telephone lines provided thereon between an upper cabinet 6a and a lower cabinet 6b, as shown in FIG. 2. Guides 8 are fixed at an upper cabinet 6a with the tips thereof protruding from slits 8a. A slider 17 as a lock releasing means is attached on lower cabinet 6b to be slidable in the direction of the arrow B and lock pawl 9 is also rotatably attached on the same, the tip of which pawl is biased in the direction of the arrow A. A connector opening 18 of lower cabinet 6b projects from the side of the lower cabinet for protecting a number of pins protruding from connector 15 and mating connector opening 28 of main body 1. Interface connector 16 is provided opposite to connection opening 19 for a connection with a telephone line.

Figure 3:
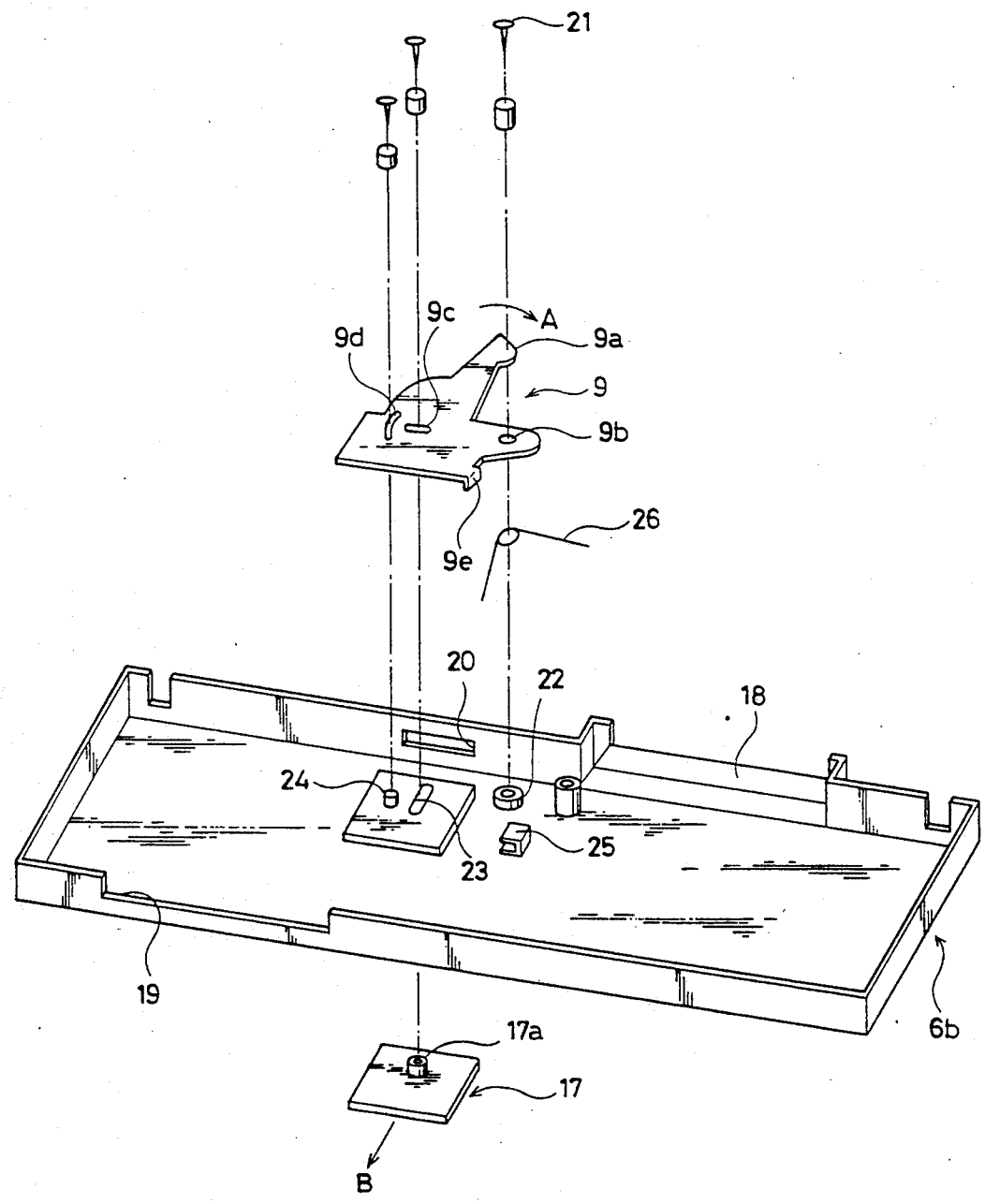
FIG. 3 is an exploded perspective view of lower cabinet 6b of FIG. 2.

FIG. 3 shows the detailed structure of lock pawl 9 seen from the front side of lower cabinet 6b of FIG. 2. Lock pawl 9 pivots on a pivot 22 of lower cabinet 6b with a tip hook 9a externally protruding from an opening 20 of lower cabinet 6b and with the center of rotation 9b pivoting on pivot 22 of lower cabinet 6b by a screw 21. A projection 17a of slider 17 inserted from below through a long hole 23 provided at lower cabinet 6b is rotatably inserted in a long hole 9c to mate a pin 24 provided at lower cabinet 6b with an arc-shaped hole 9b for guiding an external rotation. A torsion spring 26 is attached in a compression manner between a spring bearing 9e of lock pawl 9 and a spring bearing 25 of lower cabinet 6b, pivoting on pivot 22 to bias the tip hook 9a in the direction of the arrow A. On the other hand, slider 17 is moved in the direction of the arrow B to rotate hook 9a by means of projection 17a in the opposite direction to the arrow A for releasing the lock.

Figure 4:
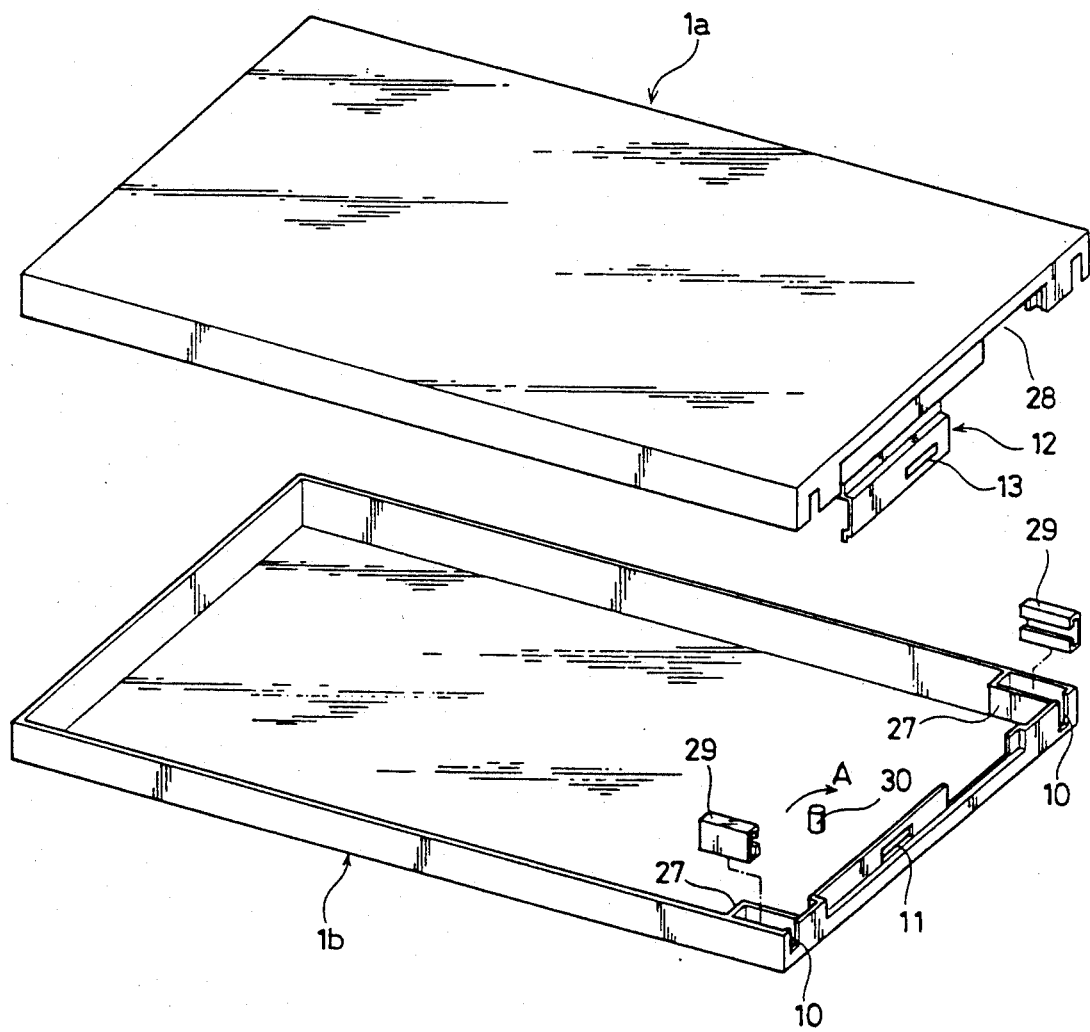
FIG. 4 is an exploded perspective view showing only the main body 1 of the portable terminal computer shown in FIG. 1.

FIG. 4 shows only the main part of main body 1 of the portable terminal computer shown in FIG. 1. Main body 1 contains a circuit board (not shown) having various circuit elements (see FIG. 5) provided between an upper cabinet 1a and a lower cabinet 1b and main body 1 has a structure for connection to modem communication device 6 provided at the side portions of upper and lower cabinets 1a and 1b. That is, each of guide inserting slots 10 at the opposite ends of the side portion is partitioned by a partition plate 27 from the circuit board so as to define a chamber, in which chamber an elastic holding member 29, is fit to hold guide 8 of modem communication device 6 (see FIG. 2) therein. Connector cover 12 is slidably fit in a male connector 39 of main body 1 (see FIG. 5) such that connector cover 12 opens and closes causing connector opening 28 to be exposed. Disposed inside pawl inserting slot 11 and provided at cabinets 1a and 1b to agree with through hole 13 through which the pawl is inserted into connector cover 12 in contact with the one end $E_0$ is a lock pin 30 which engages the tip hook 9a (see FIG. 3) of lock pawl 9 of modem communication device 6 when the hook 9a is inserted through pawl inserting slot 11. Lock pawl 9 is biased in the direction of the arrow A when engaged with lock pin 30 by torsion spring 25. The engagement is uncoupled when slider 17 (see FIG. 3) is moved in the direction of the arrow B, and therefore, the attachment of modem communication device 6 to main body 1 of the portable terminal computer is securely held.

Figure 5:
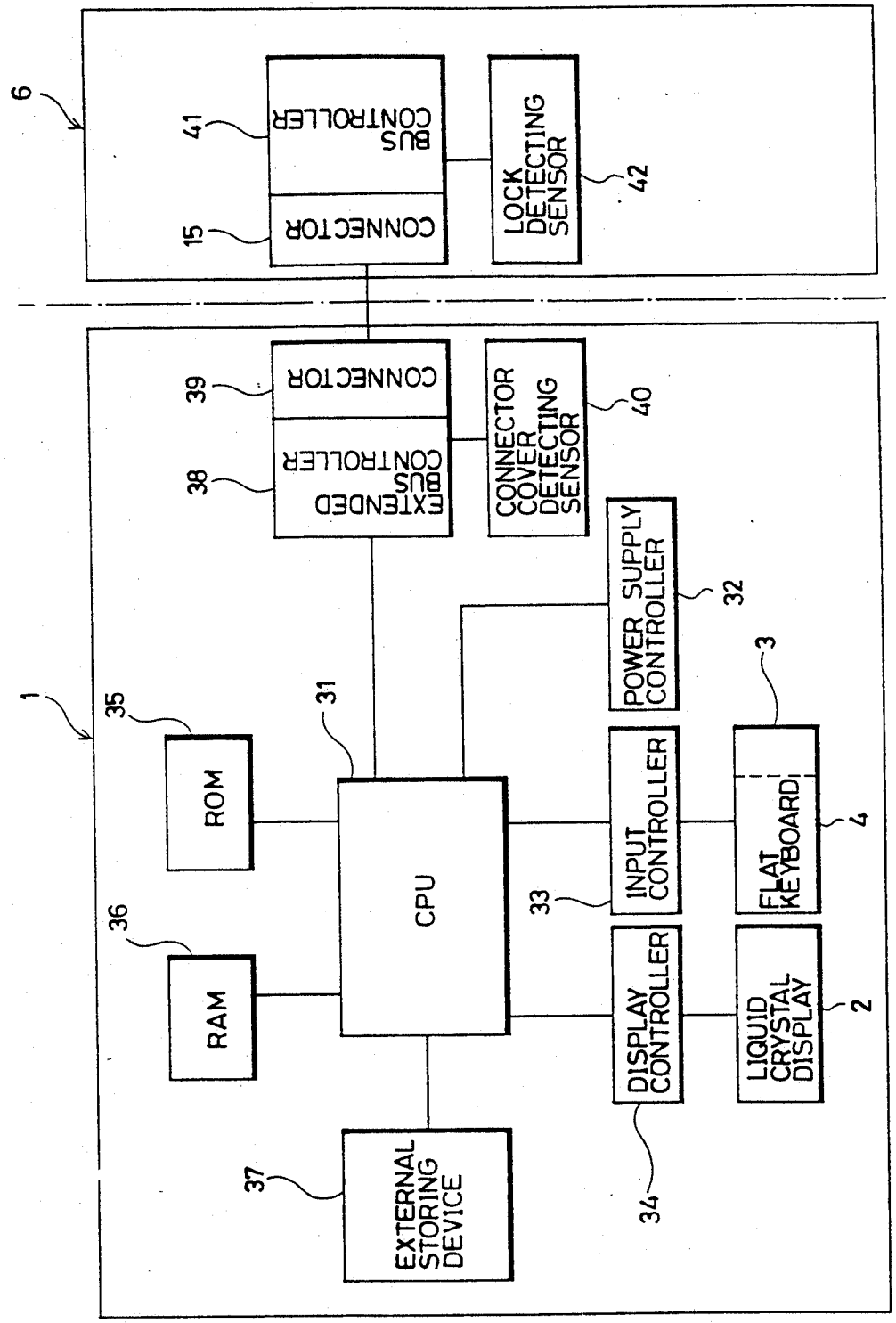
FIG. 5 is a schematic block diagram of main body 1 and modem communication device 6 of the portable terminal computer of FIG. 1.

FIG. 5 is the schematic block diagram of main body 1 of the portable terminal computer and the circuit board of modem communication device 6. Main body 1 comprises a power supply controller 32, an input controller 33 for controlling ten key 3 and flat keyboard 4, a display controller 34 for controlling liquid display 2, a CPU 31, an extended bus controller 38 having connector 39 for controlling input and output to and from modem communication device 6 and a connector cover detecting sensor 40 for detecting connector cover 12 (see FIG. 1) being opened or closed. CPU 31 controls each block and performs operations using a memory region of an RAM 36 based on an operation program recorded in an ROM 35 to input and output data to and from an external storing device 37 such as an IC card. Modem communication device 6 comprises a bus controller 41 having connector 15 for controlling input and output to and from main body 1 and a lock detecting sensor 42 for detecting lock pawl 9 (see FIG. 3) being locked or not.

Description will be made of the operation of the connection portion between main body 1 and modem communication device 6 having the above-described structure.

To attach modem communication device 6 to main body 1 of the portable terminal computer, connector cover 12 of main body 1 is shifted to one end $E_0$ in the direction of the arrow C shown in FIG. 1. Connector opening 28 and connector 39 appear, and through hole 13 of connector cover 12 aligns with pawl inserting slots 11 of cabinets 1a and 1b. Then, upon the insertion of guide 8 of modem communication device 6 into guide inserting slot 10 of main body 1, connectors 15 and 39 are mated smoothly by guides 8 and lock pawl 9 of modem communication device 6 fits in pawl inserting slot 11 through via hole 13. As a result, the tip hook 9a of lock pawl 9 (see FIG. 3) biased in the direction of the arrow A engages with lock pin 30 in cabinet 1b of main body 1. Secure engagement of lock pawl 9 with lock pin 30 prevents modem communication device 6 from pulling out of main body 1, thereby securely holding the modem even when an external force is applied to remove modem communication device 6.

Slider 17 is moved in the direction of the arrow B (see FIGS. 2 and 3) to detach modem communication device 6 from main body 1. Lock pawl 9 rotates in the opposite direction of the arrow A to disengage lock pin 30. Removing modem communication device 6 causes guides 8 to slide out of guide inserting slots 10 to smoothly detach to guide connector 15 and lock pawl 9 from main body 1 to fully detach modem communication device 6.

Connectors 15 and 39 of main body 1 and modem communication device 6, respectively, are precisely positioned by the guide of guide 8 to make a direct connection without using a flat cable. As a result, attachment and detachment of main body 1 to and from modem communication device 6 is easily and quickly performed with requiring screws or the like. In addition, it is easy to carry the main body with modem communication device 6 attached thereto and maintain a neat appearance. Even if main body 1 is transported with modem communication device 6 attached thereto, the modem device 6 does not become dislodged from the main body 1 and malfunctions from damage to or an imperfect contact of the connector are prevented because the main body 1 is securely attached by lock pawl 9.

According to the above-described embodiment, malfunction of main body 1 from dust entering the circuit board may be prevented by the partition of guide inserting slot 10 of main body 1 from the circuit board by partition plates 27 and by sliding connector cover 12 over connector opening 28 when modem communication device 6 is not attached.

Figure 6:
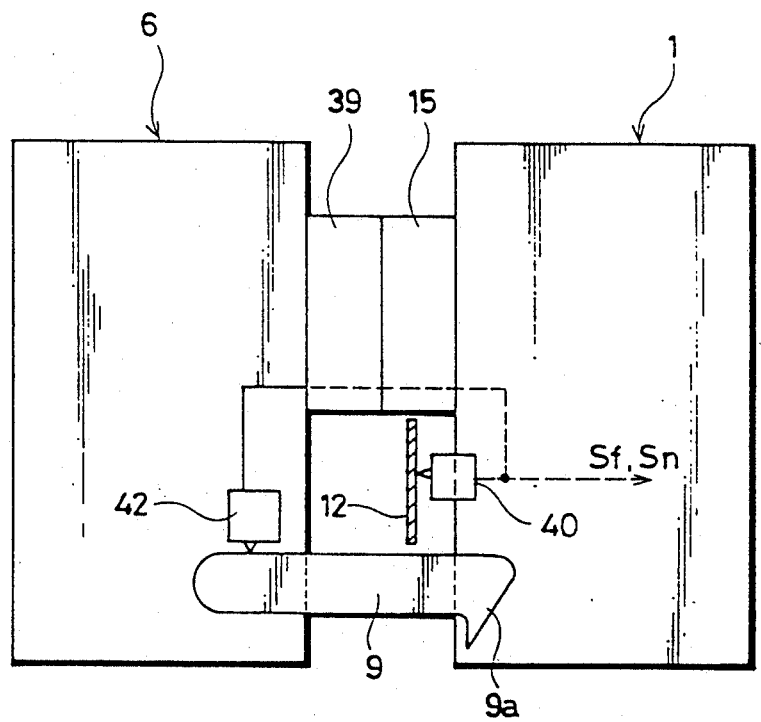
FIG. 6 is a partial detail view showing the connection between main body 1 of the portable terminal computer and modem communication device 6 of FIG. 1.

As shown in FIG. 6, connector cover detecting sensor 40 of main body 1 detects the operation of connector cover 12 to protect connector 39 and outputs an "off" instruction signal Sf when connector cover 12 is fully opened and outputs an "on" instruction signal Sn when the cover is closed, to CPU 31. Lock detecting sensor 42 of modem communication device 6 detects the operation of lock pawl 19 to output to CPU 31 of main body 1, an "off" instruction signal Sf and an "on" instruction signal Sn through connectors 15 and 39 connected to each other when the coupling to main body 1 is incomplete and when it is completed, respectively. CPU 31 receives one of the above-described off instruction signals Sf to cause power supply controller 32 to remove a power and also receives one of the above-described on instruction signals Sn to cause power supply controller 32 to restore the power supply.

The optional unit attaching and detaching operations of the portable terminal computer having the above-described arrangement are as follows.

In attaching modem communication device 6 as an optional unit to main body of the portable terminal computer, an operator fully opens connector cover 12. Connector 16 appears and connector cover detecting sensor 40 detects the connector cover 12 being fully open to output an off instruction signal Sf to CPU 31 which causes power supply controller 32 to stop supplying a power. The operator couples modem communication device 6 to main body 1 by mating the same, whereby connectors 15 and 39 are connected to each other and lock pawl 9 couples to main body 1. Lock detecting sensor 42 detects the completion of the coupling to output an "on" instruction signal Sn to CPU 31 of main body 1 through connectors 15 and 39 connected to each other, and CPU 31 causes power supply controller 32 to restore a power supply.

CPU 31 automatically controls the power supply based on status of attachment of modem communication device 6 to main body 1 via open connector cover, 12 to prevent malfunctions and permit easy attachment of modem communication device 6.

Conversely, in detaching modem communication device 6 from main body 1, the operator withdraws modem communication device 6 from main body 1 while releasing lock pawl 9. Upon detecting disengagement, of lock pawl 9 lock detecting sensor 42 outputs an "off" instruction signal Sf to CPU 31 through the still connected connectors 15 and 39, and CPU 31 causes power supply controller 32 to remove power. Modem communication device 6 is completely dismounted and connector cover 12 of main body 1 is completely closed, which is detected by connector cover detecting sensor 40 to output an "on" instruction signal Sn to CPU 31. CPU 31 then receiving the signal causes power supply controller 32 to restore power.

Therefore, CPU 31 is automatically deactivated by simply dismounting modem communication device 6 while releasing the lock of lock pawl 9. As a result, malfunctions are unlikely to occur.

The optional unit to be attached and detached to and from main body 1 is not limited to the modem communication device 6 disclosed according to the exemplary embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable terminal comprising:
 a main body;
 an optional unit connectable to said main body,
 said optional unit including:
  a connector for electrically connecting said optional unit and said main body,
  a guide member for guiding connection of said optional unit to said main body, and
  to lock pawl for coupling said optional unit to said main body,
 said main body including:
  a guide slot for receiving said guide member,
  a pawl slot for receiving said lock pawl,
  an engagement member for engaging said lock pawl when said pawl is inserted in said pawl slot, and
  a connector cover slidably movable to cover and uncover a connector opening, said connector cover including a hole for allowing said lock pawl to be inserted through said pawl slot only when said connector cover is moved to uncover said connector opening.

2. The portable terminal according to claim 1, wherein said guide slot is surrounded by a partition which together with said main body further comprises a chamber in which an elastic holding member is fit for elastically holding said guide member in said guide.

3. The portable terminal according to claim 1, wherein said lock pawl includes a hook and said engagement member includes a pin for engaging said hook to securely attach said optional unit to said main body.

4. The portable terminal according to claim 1, further comprising:
 biasing means for elastically and rotationally biasing said lock pawl to maintain the engagement with said engagement member, and
 a lock release for releasing said lock pawl by rotating said lock pawl counter to the biasing force of said biasing means.

5. A portable terminal, comprising:
 a main body,
 an optional unit including:
  locking means for securely fastening said optional unit to said main body;
  lock detecting means for detecting the status of said locking means and sending a locking status signal to said main body, and
  a connector for electrically connecting said main body and said optional unit,
 said main body including:
  a connector cover slidably provided between a first position where a connector opening is covered and a second position where said connector opening is uncovered,
  connector cover detecting means for detecting the status of said connector cover and sending a cover status signal to said main body.

6. The portable terminal according to claim 5, said main body further comprising:
 power supply controlling means responsive to status signals from one of said lock detecting means and said connector cover detecting means for controlling power to said main body.

7. A portable terminal, comprising:
 a main body having a first connector,
 an optional unit including:
  a second connector electrically connectable with said first connector,
  locking means for securely locking said optional unit to said main body, and
  lock detecting means for detecting the operation of said locking means and outputting a status signal to said main body,
 said main body including:
  a connector cover for providing access to said first connector,
  connector cover detecting means for detecting the operation of said connector cover and outputting a signal to said main body, and
  power supply controlling means responsive to signals from one of said lock detecting means and said connector cover detecting means for controlling power to said main body.

8. The portable terminal according to claim 7, wherein
 said connector cover detecting means generates a first instruction signal when said connector cover is fully opened and a second instruction signal when said connector cover is completely closed, said lock detecting means generates a first instruction signal when said locking means is unlocked and a second instruction signal when said locking means is locked, said power supply control means removes power when said main body receives said first instruction signal and supplies power when said main body receives said second instruction signal.

9. The portable terminal according to claim 7, wherein said locking means includes a lock pawl having a base portion rotatably attached to said optional unit and a hook-shaped end portion, and an engagement member having a pin fixed to said main body, wherein said hook-shaped end portion lockably engages said pin.

* * * * *